United States Patent
Linke et al.

(10) Patent No.: US 9,713,898 B2
(45) Date of Patent: Jul. 25, 2017

(54) BLOWING STATION WITH COMPRESSED AIR-OPERATED MOLD CLAMP, AND METHOD FOR HOLDING TOGETHER A BLOW MOLD OF MULTIPIECE DESIGN

(71) Applicant: KHS CORPOPLAST GMBH, Hamburg (DE)

(72) Inventors: Michael Linke, Hamburg (DE); Michael Litzenberg, Geesthacht (DE); Rolf Baumgarte, Ahrensburg (DE); Frank Lewin, Tangstedt (DE)

(73) Assignee: KHS CORPOPLAST GMBH, Hamburg (DE)

( * ) Notice: Subject to any disclaimer, the term of this patent is extended or adjusted under 35 U.S.C. 154(b) by 289 days.

(21) Appl. No.: 14/687,333

(22) Filed: Apr. 15, 2015

(65) Prior Publication Data

US 2015/0298385 A1 Oct. 22, 2015

(30) Foreign Application Priority Data

Apr. 16, 2014 (DE) .................. 10 2014 005 533

(51) Int. Cl.
| | |
|---|---|
| *B29C 49/56* | (2006.01) |
| *B29C 49/28* | (2006.01) |
| *B29C 49/18* | (2006.01) |
| *B29C 49/42* | (2006.01) |
| *B29C 49/78* | (2006.01) |
| B29L 31/00 | (2006.01) |

(52) U.S. Cl.
CPC .............. *B29C 49/28* (2013.01); *B29C 49/18* (2013.01); *B29C 49/4289* (2013.01); *B29C 49/56* (2013.01); *B29C 49/783* (2013.01); *B29C 2049/563* (2013.01); *B29L 2031/712* (2013.01)

(58) Field of Classification Search
CPC .............. B29C 49/56; B29C 2049/563; B29C 2049/5803; B29C 49/783
USPC ........................................................ 425/541
See application file for complete search history.

(56) References Cited

U.S. PATENT DOCUMENTS

| | | | | |
|---|---|---|---|---|
| 3,829,264 A | * | 8/1974 | Mnilk ..................... | B29C 49/48 |
| | | | | 425/149 |
| 6,994,542 B2 | * | 2/2006 | Tsau ........................ | B29C 49/56 |
| | | | | 425/405.1 |
| 8,038,429 B2 | | 10/2011 | Linke et al. | |

(Continued)

FOREIGN PATENT DOCUMENTS

| | | |
|---|---|---|
| DE | 102011110962 A1 | 2/2013 |
| EP | 1919690 B1 | 9/2011 |

(Continued)

*Primary Examiner* — Robert B Davis
(74) *Attorney, Agent, or Firm* — Lucas & Mercanti, LLP; Klaus P. Stoffel

(57) ABSTRACT

A method for holding together, in its closed state, a blow mold of multipiece design of a blowing station for the blow molding of containers from preforms made of a thermoplastic material using a compressed air-operated mold clamp exerting a holding-together force. The mold clamp is pressurized with compressed air for the purpose of and for the duration of the generation of the holding-together force. The blowing station has a relief valve which can be controlled by control compressed air from a control compressed air line. The mold clamp is pressurized at least at times with control compressed air from the control compressed air line.

10 Claims, 2 Drawing Sheets

(56) References Cited

U.S. PATENT DOCUMENTS

| | | | |
|---|---|---|---|
| 8,858,862 B2 | 10/2014 | Voth | |
| 2012/0098166 A1 | 4/2012 | Voth | |
| 2014/0339743 A1* | 11/2014 | Finger | B29C 49/783 264/523 |
| 2015/0042002 A1* | 2/2015 | Chomel | B29C 49/56 264/40.3 |

FOREIGN PATENT DOCUMENTS

| | | |
|---|---|---|
| EP | 2444235 A2 | 4/2012 |
| WO | 2013023789 A1 | 2/2013 |

* cited by examiner

BLOWING STATION WITH COMPRESSED AIR-OPERATED MOLD CLAMP, AND METHOD FOR HOLDING TOGETHER A BLOW MOLD OF MULTIPIECE DESIGN

CROSS-REFERENCE TO RELATED APPLICATIONS

The present application claims priority of 10 2014 005 533.7, filed Apr. 16, 2014, the priority of this application is hereby claimed and this application is incorporated herein by reference.

BACKGROUND OF THE INVENTION

The invention relates to a method for holding together a blow mold of multipiece design of a blowing station. Furthermore, the invention relates to a blowing station for a blowing machine, and also to a blowing machine.

Blowing machines for the blow molding of containers consisting of a thermoplastic material have been known for quite some time in the prior art. The containers are molded by the action of blowing compressed air in so-called blow molds. The cavity inside a blow mold forms the female mold for the container which is to be produced. In blowing machines, which work according to the principle of rotary machines, the blow molds are arranged at blowing stations which are located in the region of blowing wheels. In order to blow a container inside a blow mold, the blow mold is first of all opened and a so-called preform inserted in the blow mold. Blow molds usually consist of a plurality of segments, especially three segments, specifically typically consisting of a mold bottom and two side halves with a semi-cylindrical base contour. These blow mold segments are as a rule detachably fastened on stable blow mold carriers. The detachability enables an exchange of molds if a change is to be made from one bottle type to another bottle type which is to be produced.

For opening and closing the blow mold, the blow mold segments are moved. Typically, it involves the capability of opening up the side sections in the manner of a book and a lifting and lowering of the mold bottom. Other movements are also possible. The basic construction of a blowing station with blow mold carriers and a multipiece blow mold is described in EP 1 919 690 B1, for example.

On account of the high pressures which prevail inside the blow mold during a blow molding process, there is a necessity for locking mechanisms for the closing and clamping of the blow mold, which ensure a lock which is tight and secured against inadvertent opening of the blow mold. Such locking mechanisms are known under the term mold clamp, for example.

It is known to pressurize a mold clamp for the clamping of the blow mold with a blowing pressure, which is provided for the blowing of the containers, in parallel with the pre-blowing and final blowing of a container. That is to say, if compressed air flows into the preform, then compressed air also flows into the mold clamp. It is also known that the mold clamp is pressurized with compressed air independently of the pressurizing of the preform, retained in the blow mold, with pre-blowing air or final blowing air. To this end, provision is made, for example, for a separate valve which is electromagnetically actuated, for example. Via the actuating of this electrically operated valve, the duration of blowing pressure application to the mold clamp can be freely selected. This is preferably used in the case of blowing methods in which the duration and the force of the clamping has to be controlled independently of the blowing pressure.

If the mold clamp is pressurized with blowing pressure in parallel with the pre-blowing and final blowing, it is disadvantageous that the development of force which is generated via the blowing air in the mold clamp lags behind a rapidly developing container bubble in the blow mold. In this case, the container material can be squeezed into not yet fully closed mold gaps between the segments of the blow mold and a so-called parting line is created, which corresponds to a material surplus on the outer wall of the blown container in the region of the mold gaps. Containers with a parting line are usually treated as scrap or considered to be defective.

In the case of conventionally operated mold clamps, it has been shown to be disadvantageous that with an unfavorable ratio of the holding volume of the mold clamp in relation to the volume of the container which is to be produced frequently leads to the occurrence of parting lines. The introduction of blowing air into the preform with simultaneous introduction of the blowing air into the mold clamp occasionally leads to the preform quickly expanding and already butting against the walls of the blow mold before the mold clamp closes the mold gaps between the segments of the blow mold. It occurs for example because the feed line cross section for the introduction of the blowing air into the preform is considerably larger for constructional reasons than the feed line cross section of the mold clamp. The different feed line cross sections, with equal inlet pressure, lead to different volumetric flows and therefore to filling of the preform or of the mold clamp at a different rate. This especially makes itself felt in the case of blow molding of small containers in which the holding volume is small compared with the volume of the mold clamp.

A blowing station with a pneumatic mold clamp is known from DE 10 2011 110 962 A1, in which a supply pressure for the mold clamp is tapped from a pneumatic supply line of the blowing station.

SUMMARY OF THE INVENTION

The invention is based on the object of disclosing a method and a device by means of which the holding together of a closed blow mold in a simple and robust form is made possible. A reliable mold clamp is to be ensured and the occurrence of parting lines is to be counteracted.

The method according to the invention is distinguished by the fact that the mold clamp is pressurized at least at times with compressed air from a control compressed air line. Previously, it was customary to extract the compressed air required for the mold clamp from the blowing compressed air supply and to introduce it into the mold clamp either at the same time with the pressurizing of the preform or using a separate control valve. Before introducing blowing compressed air into the preform, control compressed air can already be directed into the mold feed line, however, without a separate switching valve necessarily being used because before commencement of the introduction of blowing pressure a vent valve is first of all to be closed as a rule by the control compressed air and in the process it can also be directed into the mold clamp. According to the invention, it is therefore made possible in a simple manner to pressurize the mold clamp with compressed air at an early stage.

In accordance with the invention is a method for holding together, in its closed state, a blow mold of multipiece design of a blowing station using a compressed air-operated mold clamp exerting a holding-together force, wherein the mold clamp is pressurized with compressed air for the purpose of and for the duration of the generation of the holding-together force, wherein the blowing station has a relief valve which can be controlled by means of control compressed air from a control compressed air line, wherein the mold clamp is pressurized at least at times with control compressed air from the control compressed air line.

The relief valve can serve for the pressure relief of the mold clamp, of a compressed air line supplying the blowing station and/or of the blow mold or of the container produced in the blow mold. Compressed air lines supplying the blowing station can be a control compressed air line or a blowing air pressure line, for example.

The mold clamp in this case is advantageously pressurized at least at times with blowing compressed air from the blowing compressed air line. This can be advantageous or even necessary if the pressure of the blowing compressed air is higher than the control pressure and, for example, an attempt is made to pressurize the blow mold in the final blowing phase. It is then possible to additionally or alternatively direct blowing compressed air into the mold clamp.

Preferably, the pressurizing is first carried out with the control compressed air and then with the blowing compressed air. The control compressed air in this case is to counteract the risk, existing at the beginning, of pressurizing the blow mold by the initially flowing-in pre-blowing air, whereas the blowing compressed air which is introduced into the mold clamp counteracts the later risk that the pressure inside the blow mold exceeds the clamping force which is applied by the mold clamp.

The pressurizing of the mold clamp with the control air is advantageously carried out at the latest at the point in time —preferably even with a time interval in advance—at which the blowing compressed air flows into a preform which is accommodated in the blow mold. The lagging behavior of the clamp which is described for the prior art can consequently be reliably avoided. In this case, the pressurizing with control compressed air and with blowing compressed air is preferably not carried out at the same time but one after the other in respect to time, e.g. first of all with control compressed air, then with blowing compressed air.

The switching between the pressurizing with control air and the pressurizing with blowing compressed air can be conducted in different ways, e.g. using at least two control valves which control the respective feeds of the control compressed air and of the blowing compressed air into the mold clamp. Preferably, however, this is carried out via a changeover valve which minimizes the circuitry cost and enables a simple retrofit capability of existing systems in a constructionally simple manner.

In this case, for example the changeover valve on a first inlet side is advantageously connected in a communicating manner to a control compressed air line, on a second inlet side to the blowing compressed air line, and on the outlet side to the mold clamp. In this way, a changeover is automatically carried out at the point in time at which the blowing compressed air exceeds the pressure of the control compressed air.

The invention furthermore relates to a blowing station for a blowing machine for the blow molding of containers from preforms consisting of a thermoplastic material, with a blow mold of multipiece design and with a compressed air-operated mold clamp for holding together the blow mold in its closed state, wherein the mold clamp is designed for implementing a method according to one of the preceding claims. That is to say, provision is made for the necessary actuating elements and pipelines to implement the method according to the invention. The advantages are gathered from the advantages according to the method and described above.

The method according to the invention and the device according to the invention are designed in such a way that after the closing of an especially multipiece blow mold they hold the segments of the blow mold in a closed position by exerting a clamping force. As a result of the clamping force, development of gaps between reciprocally movable parts of the blow mold is prevented or avoided. During the clamping of the blow mold, the effect of high pressure forces—which arise during the blowing of a container from a preform inside the blow mold—pushing apart the blow mold segments is also avoided. The clamping of a blow mold therefore especially includes the exertion of a clamping force upon a closed blow mold. The clamping force is created by the mold clamp and especially by the feed of compressed air into the mold clamp.

Also in accordance with the invention is a blowing station for a blowing machine for the blow molding of containers from preforms consisting of a thermoplastic material, with a blow mold of multipiece design and with a compressed air-operated mold clamp for holding together the blow mold in its closed state, wherein the blowing station has a relief valve which can be controlled by means of control compressed air from a control compressed air line, wherein the mold clamp is connected, or can be connected, to the control compressed air line in a communicating manner.

According to the invention, the mold clamp can be operated with blowing compressed air and with a retention air which is provided independently from the blowing compressed air. This is exemplified based on the control compressed air. If alternative compressed gas sources should be available, these alternative compressed gas sources may also be used.

Also in accordance with the invention is a blowing machine for the blow molding of containers from preforms consisting of a thermoplastic material with a blowing station of the aforesaid type according to the invention. The advantages of the blowing machine are gathered from the advantages according to the method and mentioned in relation to the blow mold.

The invention has the added advantage that at least two fluids which are independent of each other can be used for the operation of the mold clamp. By using a fluid which is independent of the blowing air an early development of force of the mold clamp can be initiated in a simple manner, especially if blowing air for the molding of a container is not yet directed into the blow mold or into the preform contained therein. For the adjustable feed of fluids to the mold feed line for the purpose of its operation, an actuating element of the subsequently described type can be used. Such an actuating element has at least two inlets and one outlet in a preferred design. The inlets can preferably be pressurized with blowing air on one side and with retention air on the other side. This retention air can be control compressed air, for example, as described previously. For feeding a fluid to the mold clamp, the outlet of the actuating element is connected to the mold clamp.

It is conceivable that the mold clamp can be operated with other fluids in addition to a blowing air and a retention air, e.g. the control compressed air. For this, the actuating element can have more than two inlets so that in addition to a blowing air and/or to a retention air another fluid, with which the mold clamp can be operated, can also be directed to said mold clamp.

The actuating element is preferably designed so that it connects one of the inlets in each case to the outlet for the passage of a fluid. In the case of this embodiment, the inlets are discretely connected to the outlet. Alternatively or additionally, the actuating element can be designed to connect the outlets in a continuous manner to the outlet. This continuous principle of operation leads to the advantage that a fluid mixture with an adjustable ratio of the fluids applied to the inlets of the actuating element can be directed to the outlet of the actuating element and therefore to the mold clamp. Both in the case of the discrete connection and in the case of the continuous connection, first inlets, or a first inlet, can be connected to the outlet and the remaining inlets can be shut off in a fluidtight, especially gastight, manner. The shutting off of inlets prevents an undesirable drain of a fluid via an inlet. In one simple embodiment, check valves can be provided in the actuating element for shutting off the inlets.

The actuating element is preferably designed so that it directs only one of the fluids to the mold clamp, especially either blowing air or control compressed air, which are applied to its inlets. More preferably, the actuating element is designed so that of the fluids being applied to its inlets it directs the fluid with the highest pressure level to the mold clamp. Alternatively or additionally, the actuating element can be designed to direct blowing air or retention air, especially at the same pressure level or only slightly different pressure levels, to the mold clamp at the same time.

The retention air is preferably extracted from a fluid source in the pneumatic system of a blowing machine, especially in the proximity of the blowing station.

In a preferred embodiment, the retention air is a control air which is provided for the actuation of valves which are arranged in the region of the blowing station. This control air can, for example, be a fluid which is provided for the switching of a vent valve which is arranged in the region of a blowing station. To be more precise, use can therefore be made of a compressed air for the mold clamp which can be tapped in the proximity of a blowing station in an early phase of the blowing process or even before the blowing process, specifically especially before the blowing passage provided for the introduction of blowing air into the blow mold is pressurized with blowing air.

An advantageous point in time for the operation of the mold clamp is, for example, when a pilot valve is switched in order to introduce a control air, provided for the switching of a vent valve, into a fluid line in the region of a blowing station.

In an especially preferred embodiment, the actuating element is a changeover valve. A changeover valve is known from the prior art as a pneumatic or hydraulic valve with at least two inlets and one outlet. If at least one of the inlets is pressurized with a fluid, this fluid is directed to the outlet of the changeover valve and therefore to the mold clamp. It can especially be provided that in dependence upon the respective pressure level of the fluids being applied to the inlets of the actuating element, the fluid with the higher pressure level is directed to the outlet of the actuating element and therefore to the mold clamp.

In a more preferred embodiment, the actuating element has a non-electrical drive. This has the advantage that a blowing station can be equipped with the mold clamp according to the invention in a simple manner. If an electrically operated actuating element is dispensed with, the adaptation or adjustment of the electric control of the blowing machine or of the blowing station can especially be dispensed with. An actuating element with mechanical drive is robust, inexpensive and low on maintenance.

The previously described blowing station according to the invention and/or the blowing machine according to the invention is, or are, especially designed for implementing the method according to the invention described in the introduction.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
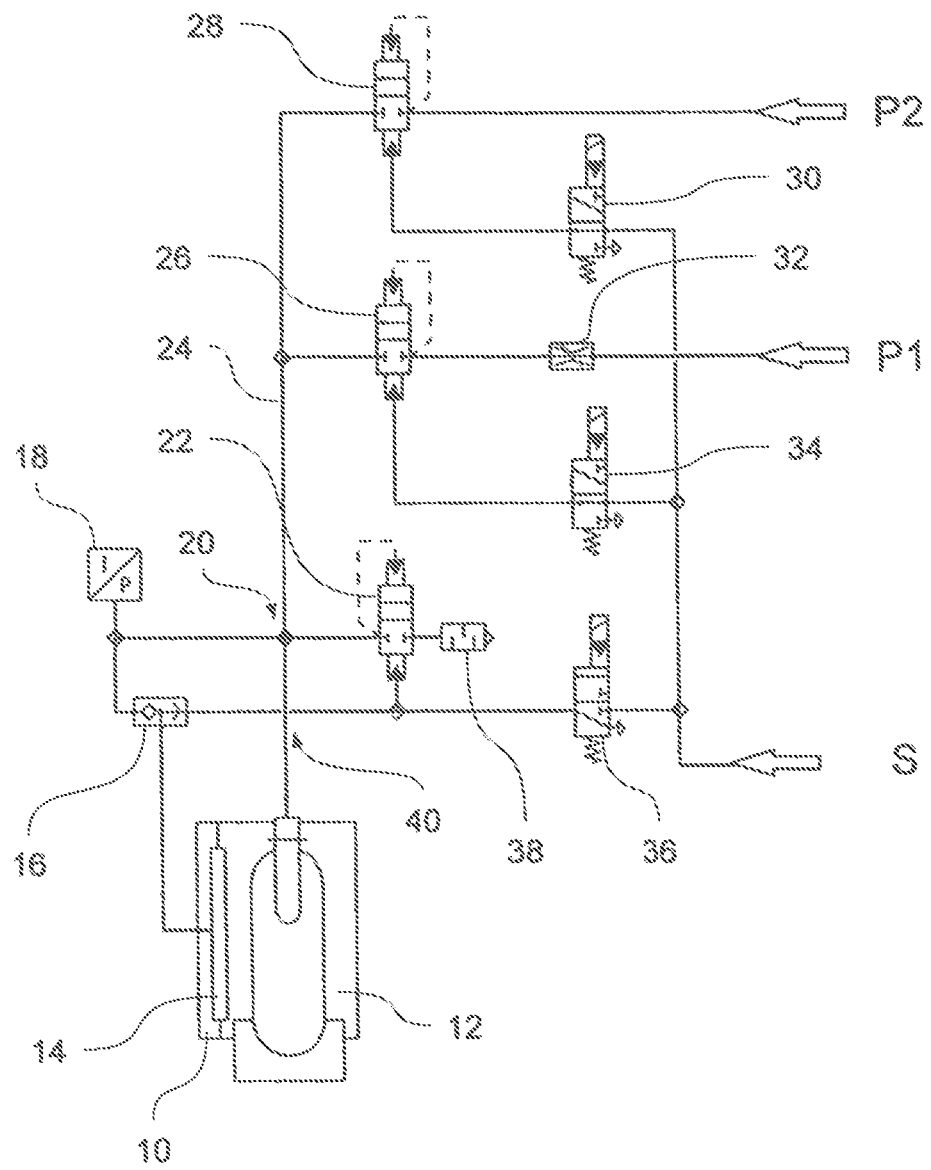
FIG. 1 shows a block diagram of a compressed gas supply in the region of a blowing station and a device according to the invention for closing off a blow mold.

FIG. 1 schematically shows a block diagram of a compressed gas supply in the region of a blowing station and a device 10 according to the invention for closing a blow mold 12. The device 10 according to the invention is equipped with a mold clamp 14 which is connected via a fluid line to an actuating element 16.

The actuating element 16 preferably has three ports. Via a first port, the actuating element 16 is connected to the mold clamp 14, as described. Via a second port, the actuating element 16 can be connected to a blowing air line 24. The blowing air line 24 conducts the blowing compressed air P1, P2 which is provided for the blowing of a container from a preform. The mold clamp 14 can therefore be pressurized with blowing compressed air P1, P2 via the actuating element 16. In an end region, the blowing air line 24 can be connected to a blow mold 12. Via this connection, the blowing compressed air P1, P2 can be directed into the blow mold 12 for the blowing of a container. Via a third port, the actuating element 16 can be connected to a valve 36 via which it can be pressurized with a control air S which is independent of the blowing compressed air P1, P2. It is conceivable that alternatively or additionally a retention air, which is independent of the control air S and of the blowing compressed air P1, P2, is fed to the actuating element and is provided for continuing to the mold clamp and for its operation (not shown).

A pressure transducer 18 for measuring the pressure level of the blowing compressed air P1, P2 can be connected to a fluid line between the actuating element 16 and the blowing air line 24.

Via the valve 28 shown in FIG. 1, blowing compressed air P2 can be introduced into the blowing air line 24. The valve 28 can be switched for example via the switching valve 30 between an open position and a closed position. To this end, the switching valve 30 is first of all opened. The fluid which is directed through the valve 30 is directed to the valve 28 and switches this into the open position. According to the aforesaid principle, the valve 26 can also be switched via a switching valve 34. Via the valve 26, blowing air P1 can be directed into the blowing air line 24. A restrictor device 32 for regulating the gas flow is preferably provided upstream of the valve 26.

In FIG. 1, it is apparent at the designation 20 that the blowing air line 24 can be connected to a vent valve 22. Via the vent valve 22, the blowing compressed air P1, P2 can preferably be discharged to the environment via a silencer 38. The blowing air line 24 can be vented in this way. A vent valve is also referred to as a relief valve.

The blowing cycle usually starts with the closing of the vent valve 22. This can be achieved by the opening of the valve 36. With the opening of the valve 36, the valve 22 is pressurized with control compressed air, as a result of which the vent valve 22 is operated into its closed position. In a following step, the control air S, which can be used especially for the switching of the vent valve 22, preferably flows via the actuating element 16 to the mold clamp 14 of the device 10. By means of this pressure application, force can be applied to the blow mold 12 early, that is to say, for example, before or at the commencement of a pressure buildup in the blowing air line 24. After commencement of the blow molding process, that is to say after introducing blowing compressed air P1, P2 into the blowing air line 24, the actuating element 16 preferably switches over from control air S or retention air to blowing compressed air P1, P2. The actuating element 16 especially switches over when the pressure level of the blowing compressed air P1, P2 at the actuating element 16 is higher than the pressure level of the control air S or retention air being applied at the actuating element 16.

The pressure level of the control air S or retention air, at the commencement of container bubble development in the blow mold 12—e.g. when the blow mold 12 is pressurized with the blowing compressed air P1—can be higher than the pressure level of the blowing compressed air P1 in the blowing air line 24. It is therefore assumed that the changeover of the actuating element 16 from control air S or retention air to blowing compressed air P1, P2 is carried out only, or at the earliest, with the introduction of blowing compressed air P2 into the blowing air line 24.

For the sake of completeness, it may be mentioned that connecting points between fluid lines for the distribution of the compressed gas which is conducted in the lines are shown in FIG. 1 as diamonds—as identified by the designation 20, for example. Intersecting lines without a connection are shown with a break in a cutting line—as identified by the designation 40, for example.

It is understood that the supply lines and connecting points between the components are preferably of a gastight construction. A device 10 with a mold clamp 14 and an actuating element 16 can be in accordance with the invention. Also in accordance with the invention can be a system which consists of a device 10 with a mold clamp 14 and a selection of components of FIG. 1.

Figure 2:
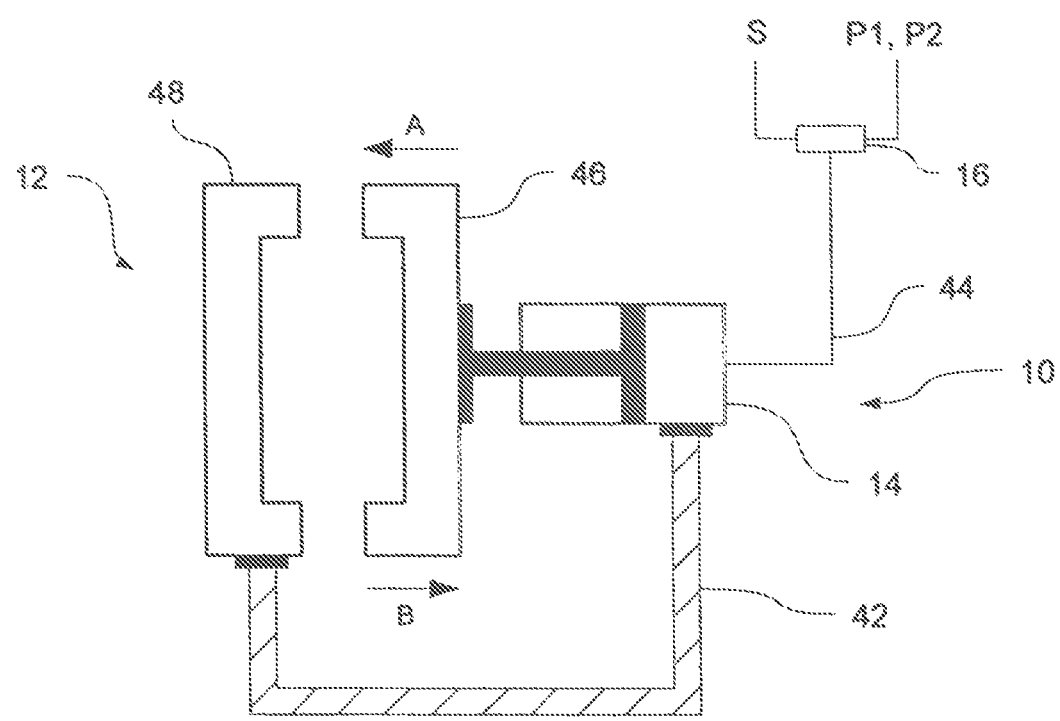
FIG. 2 shows a schematic view of a mold clamp according to the invention.

FIG. 2 shows a schematic view of a mold clamp 10 according to the invention from FIG. 1 in simplified form. As shown, the mold clamp 14, designed as a working cylinder, of the device 10 is connected by means of a fluid line 44 to an actuating element 16. The actuating element 16 preferably has a feed for a retention air S and a feed for a blowing compressed air P1, P2. If the mold clamp 14 is pressurized with a fluid via the fluid line 44, it can be provided that the mold clamp 10 tensions segments 46, 48 of a blow mold 12 against each other or presses the segments 46, 48 of the blow mold against each other. Pressing the segments 46, 48 against each other ensures a tight closure of the blow mold 12 so that the blow mold 12, under the load of high blowing air pressures inside the blow mold 12, is not inadvertently opened during the blow molding process and development of a gap between segments 46, 48 of the blow mold 12 is prevented or avoided. Naturally, the blow mold 12 can consist of additional segments, e.g. two mold halves and a bottom segment (not shown).

The arrows A and B in FIG. 2 schematically show the displacement of a first segment 46 of a blow mold 12 in relation to a second segment 48. In the direction of the arrow A, the blow mold 12 is closed. In the direction of the arrow B, the blow mold is opened. The bridge 42 schematically shows a stationary arrangement of the segment 48 in relation to a housing of the mold clamp 14. By means of the bridge 42, the segment 48 can therefore be connected to a housing of the device 10 or of a mold clamp 14 in a form-fitting and/or force-applied manner. As especially shown in FIG. 2 in a simplified manner, the device 10 in a simple variant can have a mold clamp 14, designed as a working cylinder, with a pressure cylinder and a piston for displacement of a segment 46 of the blow mold 12. Other embodiments, which fall within the concept of the subjects requiring protection, are conceivable.

While specific embodiments of the invention have been shown and described in detail to illustrate the inventive principles, it will be understood that the invention may be embodied otherwise without departing from such principles.

We claim:

1. A method for holding together a multipiece blow mold of a blowing station in a closed state for blow molding containers from preforms of a thermoplastic material using a compressed air-operated mold clamp exerting a holding-together force, the method comprising the steps of: pressurizing the mold clamp with compressed air for generating the holding-together force and for a duration of the generation of the holding-together force; and, controlling a relief valve of the blowing station by control compressed air from a control compressed air line, wherein the mold clamp is pressurized at least at times with control compressed air from the control compressed air line.

2. The method according to claim 1, including pressurizing the mold clamp at least at times with blowing compressed air from a blowing compressed air line.

3. The method according to claim 2, including initially carrying out the pressurizing with the control compressed air and then with the blowing compressed air.

4. The method according to claim 3, including carrying out the pressurizing of the mold clamp with the control compressed air at the latest at a point in time at which blowing compressed air flows into a preform that is accommodated in the blow mold.

5. The method according to claim 3, wherein the pressurizing with control compressed air and with blowing compressed air is carried out one after the other in respect to time.

6. The method according to claim 5, including carrying out a switching between the pressurizing with the control compressed air and the pressurizing with the blowing compressed air via a changeover valve.

7. A blowing station for a blowing machine for blow molding containers from preforms of a thermoplastic material, comprising: a multipiece blow mold; a compressed air-operated mold clamp for holding together the blow mold in a closed state; a control compressed air line; and a relief valve controllable by control compressed air from the control compressed air line, wherein the mold clamp is connectable to the control compressed air line for fluid communication.

8. The blowing station according to claim 7, further comprising a blowing compressed air line for providing blowing compressed air for blow molding the preforms into containers, wherein the mold clamp is connectable to the blowing compressed air line for fluid communication.

9. The blowing station according to claim 8, further comprising a changeover valve that has a first inlet side connected in fluid communication to the control compressed air line, a second inlet side connected in fluid communication to the blowing compressed air line, and an outlet side connected in fluid communication to the mold clamp.

10. A blowing machine for blow molding containers from preforms of a thermoplastic material, the blowing machine comprising a blowing station according to claim 7.

* * * * *